United States Patent Office 3,291,616
Patented Dec. 13, 1966

3,291,616
DEFATTING MEAT PRODUCTS
George E. Brissey, Chicago, Ill., assignor to Swift & Company, Chicago, Ill., a corporation of Illinois
No Drawing. Filed Jan. 31, 1964, Ser. No. 341,765
3 Claims. (Cl. 99—107)

This invention relates to improvements in the rendering of meat products to separate fat and protein portions and, more particularly, to the recovery of a flavor stabilized meat product from rendering operations.

Historically, the fatty materials obtained from meat packing operations have been heated with or without the addition of water in the well known "dry" or "wet rendering" operations. The operating conditions followed in these rendering operations were designed to obtain the best yield of edible, bland, colorless fat inasmuch as interest centered primarily on the quantity production of edible lard or lard-like products. While the meat protein part of the fatty tissue was not ignored, it did suffer somewhat from the fact that interest in the recovered fat was paramount and the solid tissue residue was recovered as browned or fried "cracklings." These cracklings, because of their flavor, appearance and utility were for the most part used in animal feeds.

More recently, emphasis has shifted to the protein portion of adipose tissue and improved rendering procedures have been developed in order to separate from the fatty tissue a substantially uncooked or undenatured protein product which can be used in manufacturing processed meats. One of the better known procedures is the low temperature rendering process. The low temperature rendering process is described in several patents among which are U.S. Patents 3,008,831, 3,020,160 and 3,078,-165. This process involves comminuting the adipose tissue such as trimmings to the form of a semisolid slurry or meat emulsion, heating the slurry or emulsion to a temperature sufficient to melt the fat, and then separating the fat from the protein portion by centrifugation or other suitable means. An important condition in the processing operation requires that the emulsion not be heated to a temperature sufficient to denature the meat protein and thus the emulsion is not heated to a temperature in excess of 120° F., and preferably, not in excess of about 118° F. The low temperature rendering process has proven to be an important advance in meat packing operations inasmuch as the method is economical and can be applied to many fatty tissue products which previously could not be used as a source of protein because of the low level of meat present in some adipose tissue and the excessive cost and difficulty involved in separating the components and recovering the meat protein. Further, the method has provided good quality, pink colored meat protein which can be used as an ingredient in processed meat such as sausage products and other cured and processed meats.

Experience has shown, however, that the improved method for recovering meat protein and the defatted chopped meat produced possess inherent limitations insofar as the use of the product in cured and processed meats is concerned. It had been expected that the meat protein product, since it is characterized as an uncooked meat protein, could be employed in such processed meats as frankfurters, bologna, meat loaf, canned luncheon meat and sausages, generally at high levels (about 25–50% of the meat formula) without changing or adversely affecting the character of the finished product. However, it has been found that the raw or uncooked meat produced by the process does undergo some flavor changes shortly after production even if stored at freezer temperatures and therefore the product has limited applicability with respect to its use in processed meats. It has been found that the use of amounts in excess of about 5% of the defatted chopped meat in frankfurters and amounts in excess of about 10% of the defatted chopped meat in bologna results in the production of off-flavors in the finished product. Consequently, the use of the defatted chopped product in cured and processed meat products has been severely limited by what appears to be a flavor precursor or tendency to develop off-flavors in the product as a result of the low temperature rendering process.

It is accordingly an object of this invention to provide improved defatted meat protein products by an improved low temperature rendering process.

Another object of the invention is to provide an improved method for handling adipose tissue of meat-bearing animals to produce a defatted chopped meat product which is resistant to the development of off-flavors.

Still another object of the invention is to provide a defatted chopped meat which can be employed in the production of cured processed meat products at levels of about 10–50% of the processed meat product without adversely affecting the flavor of the meat product.

Yet another object of the invention is to provide uncooked partially defatted chopped pork and partially defatted pork fatty tissue in the form of a frozen product which is substantially resistant to flavor degradation and development of off-flavors.

Additional objects of the invention if not specifically set forth herein will be readily apparent to those skilled in the art from the detailed description of the invention which follows.

In general, the invention involves the treatment of fatty tissue such as meat trimmings containing meat with a heme-conditioning agent and rendering of the fatty tissue at a temperature sufficiently high to liquefy the fat followed by separation of the molten fat portion from the meat protein. It is thus possible to produce a defatted chopped meat such as defatted chopped pork or defatted pork fatty tissue which can be substituted for a substantial portion of the meat now used in the production of frankfurters, bologna, and other cured and processed meat products. The process is useful in the handling of beef and pork trimmings and generally is useful in the handling of trimmings derived from the butchering of the live stock animals. Particularly useful as the source of the chopped product are skin-off plates, loin trim, belly strips, and other adipose tissue containing at least about 7% lean in the tissue and generally about 7–25% lean meat. Treatment of such adipose tissue with a heme-conditioning agent and subjecting the tissue to rendering procedures results in production of a meat protein product having a high degree of flavor stability. Whether the rendering procedure is carried out at low temperatures up to about 120° F., or higher temperature (up to about 145° F.), in which case the protein is denatured, the residue possesses a high degree of resistance to the development of off-flavors.

More particularly, the invention involves contacting fatty tissues having meat protein with a heme-conditioning agent to convert the heme pigments of the meat to a form which resists or obviates flavor degradation, comminuting the fatty tissue to the form of a slurry or emulsion and heating the slurry or emulsion to a temperature sufficient to render the fat liquid. In the low temperature rendering process this temperature is about 80–120° F. and preferably about 90–115° F. and the temperature is held for a time sufficient to melt the fat. The molten fat is then separated from the meat fibers by centrifuging or filtering or other suitable means. The uncooked, chopped meat product recovered has greatly improved flavor and flavor stability as compared to a similarly rendered product in which heme pigments are not reacted with a heme-conditioning agent.

In accordance with one embodiment of the process of the invention, the fatty tissue such as pork trimmings is first comminuted in a grinder, Fitzmill, hammermill or silent cutter. Comminution is preferably but not necessarily carried out on cold trimmings (about 40–60° F.) and the tissue is ground until it attains a consistency approximating a slurry or emulsion. Comminution of the tissue to an average particle size of about $\frac{1}{32}''$ to about $\frac{3}{8}''$ results in the production of a semi-solid emulsion or slurry. During the comminution, the cells of the tissue are broken down, facilitating the flow of fat out of the cells when the temperautre of the slurry is raised. The heme-conditioning agent, for example a nitric oxide generating material, is added and distributed throughout the slurry. The heme-conditioning agent reacts with or combines with the heme pigment of the meat to somehow reduce the activity of the heme pigment which catalyzes the development of off-flavor. The slurry or emulsion is then heated to a rendering temperature, in the case of low temperature rendering about 90–115° F. until the fat is melted, and the molten fat-meat protein mixture is then promptly centrifuged to separate the fat from the protein. It is also possible to obtain the benefits of the invention by first rendering the fatty tissue and then treat the rendered product with the heme-conditioning agent. If the protein is not used promptly it is advisable to freeze the defatted chopped product for storage and shipping as required. Since the product, unlike most conventional cured meat products, contains no added sodium chloride, it is quite resistant to the development of rancidity even when small amounts of fat up to about 30% fat remains with the chopped product. Cured meat products containing salt do not ordinarily exhibit good resistance to the development of rancidity at freezer temperatures.

The heme-conditioning agents used in the process of the invention include ascorbic acid and nitric oxide generating materials such as the alkali metal nitrites and nitrates. Particularly preferred are the alkali metal nitrites such as sodium nitrite. Such salts can be employed in very small amounts to precondition heme pigments. Amounts of about $\frac{1}{16}$–$\frac{1}{8}$ ounce alkali metal nitrite for each 100 pounds of adipose tissue are very effective in providing the benefits of the invention. Amounts up to and including about ¼ ounce alkali metal nitrite for each 100 pounds adipose tissue can also be employed as can larger and smaller amounts with varying degrees of effectiveness. It is also possible to use gaseous nitric oxide in accordance with the extraneous nitric oxide procedure disclosed in U.S. Patent 2,930,703 to R. H. Harper. The nitric oxide or nitrite curing agent can be supplemented with reducing agents such as ascorbic acid and isoascorbic acid and water-soluble salts thereof. Generally these materials can be used in amounts of about $\frac{1}{8}$–$\frac{3}{4}$ ounce per hundred weight of adipose tissue. Again as with the alkali metal nitrite curing salts larger and smaller amounts of the reducing agents can be used as desired or permitted to speed up the heme-conditioning process. The use of the water-soluble salts of ascorbic and isoascorbic acid as is known in the art is desirable under some conditions. It is thus possible in accordance with the invention to prepare freezer-stable, defatted, cured meat products which are free of added salt and which are partially or substantially free of fatty materials. These meat protein products can be incorporated in processed meats in amounts substantially in excess fo about 5–10% based on the weight of the meat product.

The following examples illustrate how to make and use the invention and the examples are not to be considered in any sense limitative.

*Example I*

Twenty pounds of pork cutting fat was ground through a Fitzmill. In the grinding of the fat a slurry was formed and the temperature of the product was raised to 85° F. The slurry was immediately chilled to 32° F. and then frozen at 0° F. The frozen product was subsequently fried and the flavor of the fried material was compared to a similarly fried sample of the original cutting fat which was not passed through the Fitzmill. The flavor rating for the original sample was 8 whereas that for the sample which had been passed through the Fitzmill and subsequently frozen was 6+.

The flavor test used in evaluating this product and the product produced in the following examples is performed by a trained expert taste panel of eight persons. This panel rates the samples tested in accordance with the scale which follows. All ratings are an average of the values assigned by individual panel members.

Rating: Quality
10 _____ Excellent
9 _____ Good +
8 _____ Good 0
7 _____ Good —
6 _____ Fair +
5 _____ Fair 0
4 _____ Fair —
3 _____ Poor +
2 _____ Poor —
1 _____ Repulsive

*Example II*

Twenty pounds of pork fatty tissue were ground through a Fitzmill to form a slurry. The slurry was then heated to 115° F. and held at this temperature for fifteen minutes. The heated slurry was then chilled to 32° F. and subsequently frozen at 0° F. After holding the sample of the original fatty tissue and the ground sample at freezer temperatures for about one month the two samples were tested for oxidative rancidity and also for taste. Oxidative rancidity determination involved determination of 2-thiobarbituric acid values generally referred to as TBA values. The taste tests were run on the fried samples. TBA and flavor evaluation of the original unground sample and the ground sample which had been heated to 115° F. is as follows:

| Sample | TBA Value | Flavor |
| --- | --- | --- |
| Original fat tissue | 0.3 | 8 |
| Original tissue ground and heated to 115° F. | 5.24 | 4 |

It can be appreciated that heating of the finely ground adipose tissue at a temperature below the denaturation temperature results in a noticeable degradation in flavor of the product and the product exhibits a tendency to develop rancidity.

TBA values are determined by the method described by E. W. Turner et al. in Food Technology, vol. 8, pages 326–329 (1954) in "Use of the 2-Thiobarbituric Acid Reagent To Measure Rancidity in Frozen Pork." As is noted in this publication, the TBA test takes advantage of a color reaction between TBA and aldehydes which are believed to be the flavor compounds responsible for oxidative rancidity. It is a sensitive test for measuring "oxidized flavor" which is associated with the development of incipient rancidity. The TBA value is the absorbency at 538 mm. using a Beckman DU Spectrophotometer.

*Example III*

Twenty pounds of pork fatty tissue were ground through a Fitzmill to convert the material to a slurry. .05 ounce of sodium nitrate was added to the slurry in the form of a 10% aqueous solution of sodium nitrite and the added sodium nitrite was distributed throughout the tissue by mixing. The product was then chilled to 32° F. and frozen at 0° F. After thirty days in the freezer, the product was tested for oxidative rancidity and was fried and flavor determinations were made. This product was compared with a portion of the original fatty material which had not been ground in the Fitzmill and had not been treated with sodium nitrite.

| Sample | TBA | Flavor |
|---|---|---|
| Original fatty tissue | 0.3 | 8 |
| Original Sample sodium nitrite treated and heated to 115° F | 0.5 | 8 |

Example IV

Twenty pounds of pork fatty trimmings were ground through a Fitzmill to form a slurry. 0.15 ounce of ascorbic acid and .05 ounce of sodium nitrite in a 10% aqueous solution was added to the slurry and mixed into the slurry uniformly. The slurry was then heated to 115° F. for fifteen minutes and then cooled to 32° F. and frozen at 0° F. This product when compared to the original trimmings which had not been treated with ascorbic acid and sodium nitrite and had not been heated showed the following TBA and flavor values:

| Sample | TBA | Flavor |
|---|---|---|
| Original tissue | 0.6 | 8 |
| Original tissue treated with ascorbic acid and sodium nitrite and heated to 115° F | 0.2 | 8 |

Example V

Twenty pounds of pork fatty trimmings were run through a Fitzmill to form a slurry and ascorbic acid in the amount of 0.15 ounce was added to the slurry and uniformly distributed throughout the slurry. After heating of the slurry for fifteen minutes at 115° F. the product was chilled to 32° F. and then frozen at 0° F. Flavor and rancidity tests on the product after storage at 0° F. for 45 days were compared to flavor and rancidity of the original sample which was not treated with ascorbic acid or heated. The results are as follows:

| Sample | TBA | Flavor |
|---|---|---|
| Original fatty tissue | 0.6 | 8 |
| Original fatty tissue containing ascorbic acid and heated to 115° F | 1.0 | 7 |

Example VI

Several frankfurter samples were prepared utilizing the chopped meat protein derived from the experiments of the preceding examples as a substitute for a portion of the meat conventionally used in the frankfurter emulsion. The formula for the frankfurters was as follows:

Ingredient: Amount, pounds
50–50 pork trimmings _____ 10
Cow meat _____ 20
Water _____ 12
Salt, sugar, curing salt and ascorbic acid _____ [1] 3.5
Product of Examples 1–6 _____ 10

[1] Ascorbic acid ¾ oz. cwt. meat; curing salt ¼ oz. cwt. meat.

The frankfurters were cooked and the various samples were tested by the expert taste panel for flavor. The results of these flavor tests are as follows:

Frankfurters containing: Flavor rating
Ground fatty tissue of Example I _____ 6.6
Ground fatty tissue of Example II heated to 115° F. for fifteen minutes _____ 3.9
Ground fatty tissue of Example III _____ 6.9
Ground fatty tissue of Example IV _____ 6.9
Ground fatty tissue of Example V _____ 6.5

It is clear from the flavor evaluation that in those cases where the heme pigment of the lean portion of the fatty tissue is preconditioned, the flavor of processed meats containing such products is superior.

Example VII

Two pounds of beef flanks was ground and mixed with 1.4 cc. of a 10% sodium nitrite solution. The semi-solid emulsion which was formed was held at 45° F. for eighteen hours and then heated to 118° F. for fifteen minutes, followed by centrifugation. The protein tissue which was recovered was fried and rated 7 on the flavor scale by the flavor panel. A sample of the same beef flank meat which was ground in exactly the same manner and also heated to 118° F. before centrifugation but which contained no added sodium nitrite was rated 4 by the flavor panel.

Example VIII

In order to illustrate the flavor stability and resistance to development of off-flavor of the frozen product, two pounds of 50–50 pork trimmings was ground cold through a ⅛ inch plate and .005 ounce of sodium nitrite as a 10% aqueous solution was added to the ground sample and mixed throughout the sample. The semi-solid slurry was heated to 115° F. for fifteen minutes, then centrifuged and the protein was separated from the fat. The separated protein product was chilled to 32° F. and then frozen at 0° F. Flavor determination and TBA values were obtained after varying time periods of holding of the frozen product. The following table shows the characteristics of the product after freezing:

| Time at 0° F. | TBA | Flavor |
|---|---|---|
| 0 | 1.0 | 7 |
| 3 weeks | 1.1 | 7 |
| 6 weeks | 4.4 | 7 |

A control sample prepared in exactly the same manner with the exception that no sodium nitrite was added to the sample was rated 4 in the flavor score immediately after it was prepared.

It is possible by the method of the invention to produce flavor stabilized partially defatted chopped pork and partially defatted pork fatty tissue which can be substituted in large amounts up to about 50% for the meat present in processed meat products. The partially defatted material can contain as much as 80% lean meat derived from chilling fats and cutting fats and can be used as a substitute for lean beef, jowls, trimmings, cutter and canner beef and neck bone trimmings in processed products such as bologna, frankfurters, and sausage products generally.

Example IX

One hundred pounds of pork jowls was ground through a one-eighth inch plate and the resultant semi-solid slurry was centrifuged to recover thirty pounds of partially defatted chopped pork. Fifteen pounds of this product was frozen at 0° F. and the other fifteen pounds was treated with a heme-conditioning agent by adding .0375 ounce of sodium nitrite to the sample and distributing the sodium nitrite uniformly throughout the sample. After the typical pink cure color developed, this sample was also frozen at 0° F. Flavor determination and TBA values were obtained after one day storage at 0° F. and after thirty days storage at 0° F. The following table shows the improvement in flavor stability and resistance to development of off-flavor in the treated product:

| Time at 0° F. | Control Sample | | Sodium Nitrite Treated Sample | |
|---|---|---|---|---|
| | TBA | Flavor | TBA | Flavor |
| 1 Day | 0.6 | 7 | 0.4 | 8 |
| 1 Month | 4.4 | 4 | 0.3 | 8 |

It is clear that even with those products which possess good flavor and good resistance to rancidity 1 day after production, flavor degradation is substantial in 1 month if the heme pigments are not reacted with a heme-conditioning agent.

Obviously many variations and modifications of the invention as hereinbefore set forth may be made without departing from the spirit and scope thereof and therefore, only those limitations should be imposed as are indicated in the appended claims.

I claim:
1. An improved method for producing an uncooked flavor-stabilized cured meat containing no added sodium chloride and having a major protein portion comprising: contacting uncooked animal tissue having a substantial fat portion with a heme-conditioning agent free of sodium chloride; thereafter comminuting the tissue to produce a semi-solid emulsion; heating the emulsion from about 80° F. to about 120° F. for a time sufficient to liquefy at least a portion of the fat and insufficient to denature the meat proteins of the solid residue; and separating the molten fat from the residue, said residue having a fat content to about 30%.

2. In the method of claim 1 wherein the heme-conditioning agent is mixed with a reducing agent selected from the group consisting of water-soluble salts of ascorbic and isoascorbic acid; comminuting the tissues to an average particle size from about 1/32 to about 3/8 inch; and heating the emulsion to a temperature of from about 90° F. to about 115° F.

3. An improved method for producing an uncooked flavor-stabilized cured meat containing no added sodium chloride and having a major protein portion comprising: comminuting uncooked animal tissue having a substantial fat portion to produce a semi-solid emulsion; heating the emulsion from about 80° F. to about 120° F. for a time sufficient to liquefy at least a portion of the fat and insufficient to denature the meat proteins of the solid residue; separating the molten fat from the residue, said residue having a fat content to about 30%; and contacting the residue with a heme-conditioning agent free of sodium chloride.

References Cited by the Examiner
UNITED STATES PATENTS

| 2,323,466 | 7/1943 | Griffith. | |
| 2,930,703 | 3/1960 | Harper | 99—109 X |
| 2,952,552 | 9/1960 | Ansel | 99—107 X |
| 3,008,831 | 11/1961 | Christianson | 99—109 |
| 3,078,287 | 2/1963 | Downing | 19—109 X |
| 3,177,080 | 4/1965 | Alberts. | |

A. LOUIS MONACELL, *Primary Examiner.*

HYMAN LORD, RAYMOND N. JONES, *Examiners.*